United States Patent
Min et al.

(10) Patent No.: US 12,539,343 B2
(45) Date of Patent: Feb. 3, 2026

(54) **DEVICE FOR REDUCING OOCYSTS OF *EIMERIA* SPP. USING MICROWAVE**

(71) Applicant: HOXBIO CO., LTD., Gyeongsangnam-do (KR)

(72) Inventors: Wongi Min, Gyeongsangnam-do (KR); Dongjean Yim, Gyeongsangnam-do (KR)

(73) Assignee: HOXBIO CO., LTD., Gyeongsangnam-Do (KR)

( * ) Notice: Subject to any disclaimer, the term of this patent is extended or adjusted under 35 U.S.C. 154(b) by 356 days.

(21) Appl. No.: 18/289,160

(22) PCT Filed: Sep. 20, 2023

(86) PCT No.: PCT/KR2023/014228
§ 371 (c)(1),
(2) Date: Nov. 1, 2023

(87) PCT Pub. No.: WO2024/257953
PCT Pub. Date: Dec. 19, 2024

(65) Prior Publication Data
US 2025/0099639 A1 Mar. 27, 2025

(30) Foreign Application Priority Data
Jun. 15, 2023 (KR) .................. 10-2023-0076602

(51) Int. Cl.
*A61L 2/12* (2006.01)
*A61L 2/26* (2006.01)

(52) U.S. Cl.
CPC ................... *A61L 2/12* (2013.01); *A61L 2/26* (2013.01); *A61L 2202/11* (2013.01); *A61L 2202/14* (2013.01); *A61L 2202/16* (2013.01)

(58) Field of Classification Search
CPC .......... A61L 2/12; A61L 2/26; A61L 2202/11; A61L 2202/14; A61L 2202/16
See application file for complete search history.

(56) References Cited

U.S. PATENT DOCUMENTS

2004/0037751 A1* 2/2004 Wayland ................. A61L 11/00
422/4
2013/0298842 A1* 11/2013 Underwood ........... A01K 31/04
119/442

FOREIGN PATENT DOCUMENTS

KR 10-2016-0145328 A 12/2016
WO WO-2021133828 A1 * 7/2021 .......... A01K 1/0156

OTHER PUBLICATIONS

Rami A Dalloul et al., "Poultry coccidiosis: recent advancements in control measures and vaccine development", Expert Rev. Vaccines, 2006, vol. 5, No. 1, pp. 143-163, DOI:10.1586/14760584.5.1.143.
(Continued)

*Primary Examiner* — David E Smith
(74) *Attorney, Agent, or Firm* — The PL Law Group, PLLC

(57) ABSTRACT

A device for reducing oocysts of *Eimeria* spp. uses microwave. In the device, when breeding broiler chickens, litter is recycled for second to fifth breeding after first breeding, and the hardened litter is crushed through a crushing device to form a floor similar to a first breeding environment and simultaneously microwaves of a microwave device are irradiated onto the crushed litter, so that various pathogenic organism such as oocysts of *Eimeria* spp., viruses, bacteria, parasites, and fungi in the litter are reduced or killed, and thus, pathogenicity and mortality become low, thereby healthily and safely breeding broiler chickens, and accordingly, providing great economic help to poultry farms.

5 Claims, 4 Drawing Sheets

(56) References Cited

OTHER PUBLICATIONS

R.B. Williams, "A compartmentalised model for the estimation of the cost of coccidiosis to the world's chicken production industry", International Journal for Parasitology, 2019, vol. 29, pp. 1209-1220.
G.M. Morris et al., "Biotechnological advances in the diagnosis of avian coccidiosis and the analysis of genetic variation in Eimeria", Biotechnology Advances, 2006, vol. 24, pp. 590-603.
Wongi Min et al., "Recent progress in host immunity to avian coccidiosis: IL-17 family cytokines as sentinels of the intestinal mucosa", Developmental and Comparative Immunology, 2013, vol. 41, pp. 418-428.
A. Du et al., "Effects of a Herbal Complex Against Eimeria tenella Infection in Chickens". J. Vet. Med. B, 2004, vol. 51, pp. 194-197, DOI: 10.1111/j.1439-0450.2004.00749.x.
Byung H. Lee et al., "Prevalence and Cross-Immunity of *Eimeria* Species on Korean Chicken Farms", J. Vet. Med. Sci., 2010, vol. 72, No. 8, pp. 985-989.
Rochelle A. Flores et al., "Epidemiological investigation and drug resistance of *Eimeria* species in Korean chicken farms", BMC Veterinary Research, 2022, vol. 18, article No. 277, DOI:10.1186/s12917-022-03369-3.
P. C. Allen et al., "Recent Advances in Biology and Immunobiology of *Eimeria* Species and in Diagnosis and Control of Infection with These Coccidian Parasites of Poultry", Clinical Microbiology Reviews, Jan. 2002, vol. 15, No. 1, pp. 58-65, DOI: 10.1128/CMR.15.1.58-65.2002.
H. D. Chapman, "Biochemical, genetic and applied aspects of drug resistance in Eimeria parasites of the fowl", Avian Pathology, 1997, vol. 26, pp. 221-244.
Joy Gararawa Usman et al., "Anticoccidial Resistance In Poultry: A Review", New York Science Journal, 2011, vol. 4, No. 8, pp. 102-109.
R.B. Williams, "A compartmentalised model for the estimation of the cost of coccidiosis to the world's chicken production industry", International Journal for Parasitology, 1999, vol. 29, pp. 1209-1229.

* cited by examiner

DEVICE FOR REDUCING OOCYSTS OF *EIMERIA* SPP. USING MICROWAVE

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2023/014228, filed Sep. 20, 2023, which claims priority to the benefit of Korean Patent Application No. 10-2023-0076602 filed in the Korean Intellectual Property Office on Jun. 15, 2023, the entire contents of which are incorporated herein by reference.

BACKGROUND

1. Technical Field

The present invention relates to a device for reducing oocysts of *Eimeria* spp. using microwave, and more particularly to, a device for reducing oocysts of *Eimeria* spp. using microwave, in which when breeding broiler chickens, litter is mostly recycled for second to fifth breeding after first breeding, and the hardened litter is crushed through a crushing device to form a floor similar to a first breeding environment and simultaneously microwaves of a microwave device are irradiated onto the crushed litter, so that various pathogenic organism such as oocysts of *Eimeria* spp., viruses, bacteria, parasites, and fungi in the litter are reduced or killed, and thus, pathogenicity and mortality become low, thereby healthily and safely breeding broiler chickens, and accordingly, providing great economic help to poultry farms.

The results have been achieved with the support from the Ministry of Agriculture, Food and Rural Affairs and Korea Institute of Planning and Evaluation for Technology in Food, Agriculture, and Forestry (project identification No. 1545027936, detailed project No. 322056022SB020).

2. Background Art

Oocysts belonging to the genus *Eimeria* are significant causing global economic losses of $3 billion annually in the poultry industry worldwide (Dalloul and Lillehoj, 2006; Williams, 1999). In chickens infected with *Eimeria* spp. reduced body weight occurs due to diarrhea, weakness, and reduced feed efficiency, and intestinal lesions are prone to bleeding and are vulnerable to infections from other pathogens such as bacteria and viruses (Morris and Gasser, 2006; Min et al., 2013). The infection rate of domestic poultry farms by *Eimeria* spp. is about 70% to about 80% (Du and Hu, 2004; Lee et al., 2010; Flores et al., 2022).

In addition, the oocysts causing coccidiosis mainly consist of seven species (*E. acervulina, E. brunetti, E. maxima, E. mitis, E. necatrix, E. praecox,* and *E. tenella*), and among these, specially *Eimeria tenella*, which is parasitic in the cecum of chickens, is the most pathogenic and has a high mortality rate, causing great economic damage to poultry farms (Allen and Fetterer, 2002).

Anticoccidial drugs to prevent this disease have been completely banned in the European Union since 2006 due to the issue of antibiotic residues in livestock products, such as Korean Patent Publication No. 10-2016-0145328 in which *Eimeria* spp. is effectively suppressed but drug-resistant protozoa are prone to appear due to long-term use (Chapman, 1997; Usman et al., 2011; Flores et al., 2022).

SUMMARY

Provided is a device for reducing oocysts of *Eimeria* spp. using microwave in which when breeding broiler chickens, litter is recycled for second to fifth breeding after first breeding, and the hardened litter is crushed through a crushing device to form a floor similar to a first breeding environment and simultaneously microwaves of a microwave device are irradiated onto the crushed litter, so that various pathogenic organism such as oocysts of *Eimeria* spp., viruses, bacteria, parasites, and fungi in the litter are reduced or killed, and thus, pathogenicity and mortality become low, thereby healthily and safely breeding broiler chickens, and accordingly, providing great economic help to poultry farms.

According to an aspect of the present invention, a device for reducing oocysts of *Eimeria* spp. using microwave includes a main body unit with a plurality of wheel portions installed at a bottom side thereof to be movable, and a handle portion installed at a top portion thereof to control a direction of movement, a crushing device installed on a front bottom surface of the main body unit to crush and turn over litter in a chicken coop as it moves, a microwave device installed on a bottom side surface of the main body unit and irradiating microwave to the litter of the chicken coop that is crushed and turned over by the crushing device to reduce oocysts of *Eimeria* spp., and a control unit installed on a top surface of the main body unit and connected to the microwave device, and controlling the microwave of the microwave device.

The crushing device may include a plurality of connection rods installed on the front bottom surface of the main body unit, and connected to the main body unit with a gear to be rotatable, a plurality of crushing blades connected to each other by a rotating shaft between the connection rods and directly crushing and turning over the litter of the chicken coop according to the rotation of the rotating shaft, and a blocking film installed on the plurality of connection rods which are top sides of the plurality of crushing blades to protect the plurality of crushing blades from the outside and simultaneously to prevent the litter crushed by the plurality of crushing blades from scattering upward.

A motor unit connected to the rotation shaft of the plurality of crushing blades to rotate the rotation shaft may be further installed on one top side of the main body unit, and operate under the control of the control unit.

A battery unit supplying power to the microwave device, the control unit, and the motor unit may be further installed on the other top side of the main body unit.

A plurality of microwave devices may be installed on the bottom side surface of the main body unit, connected to the control unit, and controlled by the control unit.

As described above, in the device for reducing oocysts of *Eimeria* spp. using microwave of the present invention, when breeding broiler chickens, litter is recycled for second to fifth breeding after first breeding, and the hardened litter is crushed through a crushing device to form a floor similar to a first breeding environment and simultaneously microwaves of a microwave device are irradiated onto the crushed litter, so that various pathogenic organism such as oocysts of *Eimeria* spp., viruses, bacteria, parasites, and fungi in the litter are reduced or killed, and thus, pathogenicity and mortality become low, thereby healthily and safely breeding broiler chickens, and accordingly, providing great economic help to poultry farms.

DETAILED DESCRIPTION

Figure 1:
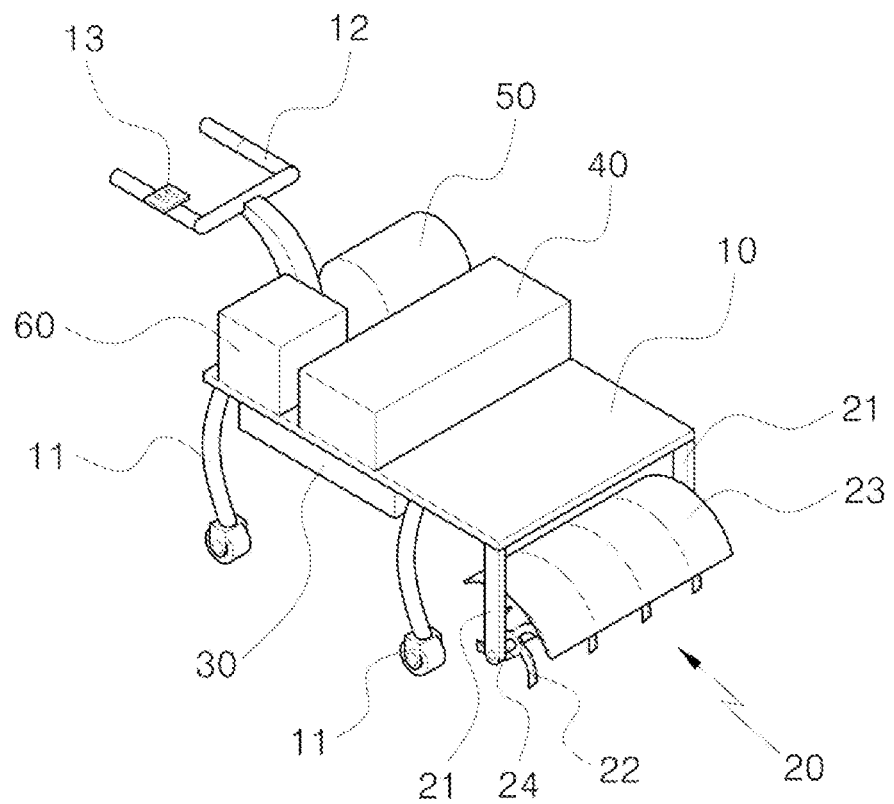
FIG. 1 is a perspective view showing a device for reducing oocysts of *Eimeria* spp. using microwave according to an embodiment of the present invention.

The present invention having such features may be more clearly described through preferred embodiments according thereto.

Before describing various embodiments of the present invention in detail with reference to the accompanying drawings, it will be appreciated that the application is not limited to the details of configurations and arrangements of elements described in the following detailed description or illustrated in the drawings. The present invention may be implemented and practiced in different embodiments, and may be performed in various ways. Also, it will be appreciated that the expressions and predicates used herein with respect to terms such as the device or element orientation (e.g. "front", "back", "up", "down", "top", "bottom", "left", "right", and "lateral"), etc. are used only to simplify the description of the present invention, and related device or element does not indicate or mean simply a specific orientation. Further, terms such as "first" and "second" are used in this application and the appended claims for purposes of explanation and are not intended to represent or imply any relative importance or spirit.

Accordingly, the embodiments described in the present specification and the configurations shown in the drawings are only the most preferred embodiments of the present invention, and do not represent all the technical ideas of the present invention, it should be understood that there may be various equivalents and variation that may replace these at the time of filing the present application.

Figure 2:
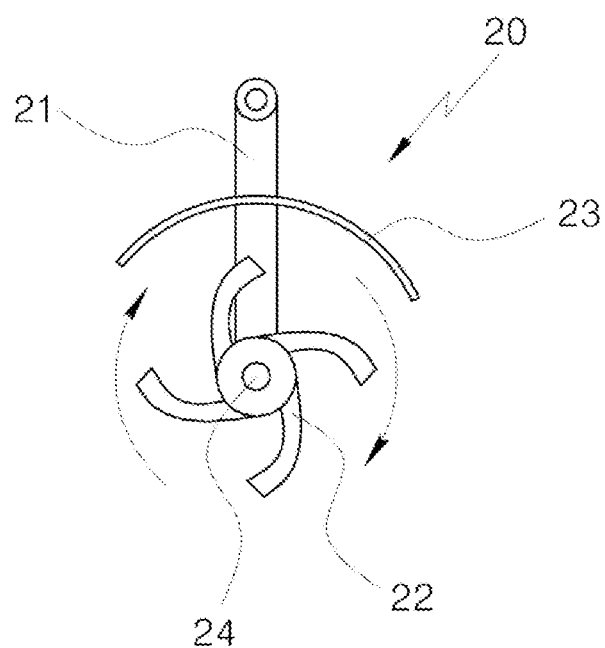
FIG. 2 is a side view showing a crushing device according to an embodiment of the present invention.
Figure 3:
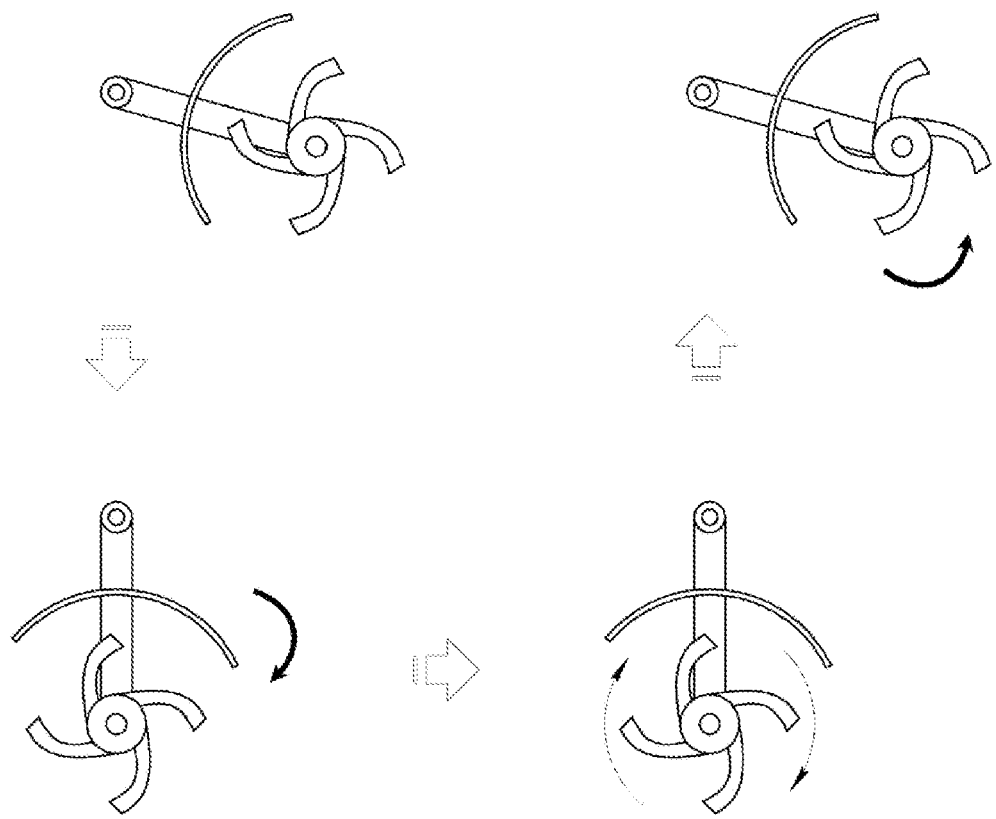
FIG. 3 is a diagram showing an operation of the crushing device according to an embodiment of the present invention.
Figure 4:
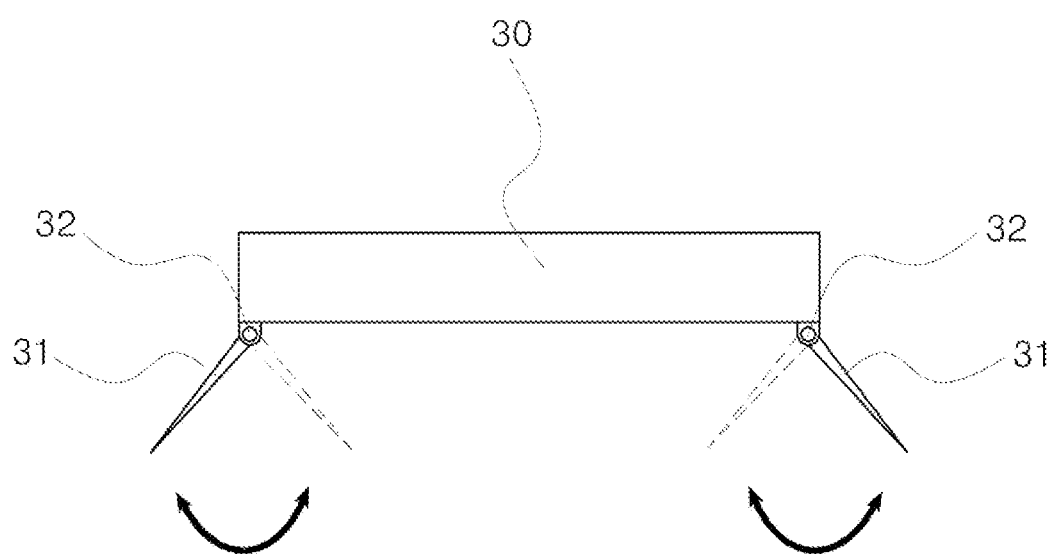
FIG. 4 is a front view showing a microwave device according to an embodiment of the present invention.

FIG. 1 is a perspective view showing a device for reducing oocysts of *Eimeria* spp. using microwave according to an embodiment of the present invention. FIG. 2 is a side view showing a crushing device according to an embodiment of the present invention. FIG. 3 is a diagram showing an operation of the crushing device according to an embodiment of the present invention. FIG. 4 is a front view showing a microwave device according to an embodiment of the present invention.

As shown in FIGS. 1 to 4, the device for reducing oocysts of *Eimeria* spp. using microwave of the present invention includes a main body unit 10 with a plurality of wheel portions 11 installed at a bottom portion thereof to be movable, and a handle portion 12 installed at a top portion thereof to control a direction of movement, a crushing device 20 installed on a front bottom surface of the main body unit 10 to crush and turn over litter in a chicken coop as it moves, a microwave device 30 installed on a bottom side surface of the main body unit 10 and irradiating microwave to the litter of the chicken coop that is crushed and turned over by the crushing device 20 to reduce oocysts of *Eimeria* spp., and a control unit 40 installed on a top surface of the main body unit 10 and connected to the microwave device 30, and controlling the microwave of the microwave device 30.

As shown in FIG. 1, the main body unit 10 is formed in a rectangular plate, the handle portion 12, the control unit 40, a motor unit 50, and a battery unit 60 are formed in a top portion of the main body unit 10, and the wheel portions 11, the microwave device 30, and the crushing device 20 are formed in a bottom portion of the main body unit 10.

Here, the wheel portions 11 of the main body unit 10 are formed so that the main body unit 10 is spaced apart from the ground to be movable, has a plurality of legs each of a predetermined length installed on a bottom surface of the plate, and has wheels for moving the main body unit 10 respectively installed at ends of the legs. At this time, the wheels are respectively connected to the ends of the legs so as to enable switching of forward, backward, left, and right directions, and a braking device controlling movement is further installed on the wheels.

In addition, the handle portion 12 of the main body unit 10 is installed at the back of a top surface of the plate and formed to protrude toward a top back side of the plate so that a user may hold the handle portion 12 and push the main body unit 10. A switch portion 13 electrically connected to the control unit 40 and capable of operating the control unit 40 is further installed on the handle portion 12. At this time, a switch capable of operating ON/OFF of the motor unit 50, the microwave intensity and time of the microwave device 30, etc. is formed in the switch portion 13.

As shown in FIGS. 1 to 3, the crushing device 20 is installed on the front bottom surface of the main body unit 10 and includes connection rods 21, crushing blades 22, and a blocking film 23 to crush and turn over the litter of the chicken coop as it moves.

Here, a plurality of connection rods 21 are installed on the front bottom surface of the main body unit 10, and, as shown in FIGS. 2 and 3, are connected to the main body unit 10 with a hinge and a gear to be rotatable. The gear is connected to a separate motor so that ends of the connection rods 21 may be rotated by the operation of the motor. At this time, the motor is connected to the battery unit 60 and the control unit 40, receives power from the battery unit 60, and is controlled through the control unit 40. That is, ends of the connection rod 21 is rotated by the motor to prevent the crushing device 20 from contacting the ground by rotating upward normally during the movement of the main body unit 10 and during an operation, the connection rod 21 is rotated downward so that the crushing blades 22 of the crushing device 20 may be inserted into the litter at a predetermined interval.

In addition, the crushing blades 22 are connected to each other by a rotating shaft 24 between the connection rods 21 and serves to directly crush and turn over the litter of the chicken coop according to the rotation of the rotating shaft 24, and a plurality of crushing blades 22 are spaced apart from each other along the rotation shaft 24 and are formed, so that a wide range of litter may be crushed and turned over. In other words, the crushing blades 22 serve to crush hardened litter into small pieces while crushing the litter.

In addition, the blocking film 23 is installed on the connection rods 21 which are top sides of the plurality of crushing blades 22 to protect the crushing blades 22 from the outside and simultaneously prevent the litter crushed by the crushing blades 22 from scattering upward, and is formed to be curved to protect and prevent scattering in accordance with the rotation of the crushing blades 22.

Meanwhile, the motor unit 50 connected to the rotation shaft 24 of the crushing blades 22 by a connecting member such as a chain to rotate the rotation shaft 24 is further installed on one top side of the main body unit 10, and operates under the control of the control unit 40.

As shown in FIGS. 1 and 4, the microwave device 30 is installed on the bottom surface of the main body unit 10 and radiates microwave to the litter of the chicken coop crushed and turned over by the crushing device 20, thereby reducing or killing oocysts of *Eimeria* spp. At this time, the microwave device 30 irradiates microwave in a downward direction.

Here, a plurality of microwave devices 30 are installed on the bottom side surface of the main body unit 10, connected to the control unit 40, and controlled by the control unit 40. One of the microwave devices 30 reduces or kills oocysts of *Eimeria* spp. by irradiating 700 W of microwave for about 20 to 30 seconds.

Also, as shown in FIG. 4, a cooking plate 31 is formed at bottom edges of the microwave device 30 to control the spread of the irradiated microwave, and is connected to all surfaces of the bottom edges of the microwave device 30 by respective hinge shafts 32, so that the microwave spreads widely or focuses on one area according to the rotation of the hinge shafts 32.

In addition, a plurality of hinge shafts 32 of the cooking plate 31 are formed along the bottom edge of the microwave device 30, and are interconnected in a state in which a gear such as a worm gear is formed on one side of each of the hinge shafts 32, so that when one hinge shaft 32 is rotated, the other hinge shaft 32 is simultaneously also rotated in the same direction, thereby adjusting an angles of the cooking plate 31 in the same way. At this time, one hinge shaft 32 of the plurality of hinge shafts 32 is connected to a separate motor and rotated, and the motor is connected to the battery unit 60 and the control unit 40 to receive power from the battery unit 60 and be controlled through the control unit 40.

As shown in FIG. 1, the control unit 40 is connected to the microwave device 30, the motor unit 50, the battery unit 60, and a plurality of motors by electrical signals, is installed on the top surface of the main body unit 10, and is connected to the microwave device 30 to control the microwave intensity, time, power, etc. of the microwave device 30.

Meanwhile, the battery unit 60 that supplies power to the microwave device 30, the control unit 40, the motor unit 50, and the plurality of motors is further installed on the other top side of the main body unit 10, and is rechargeably connected to an external power source to charge power.

Hereinafter, results of an experiment showing that oocyst of *Eimeria tenella* may be killed using the microwave of the present invention as described above.

1. In Vitro Experiment Results: Microwave Effectively Destroyed Fecal Oocyst of *Eimeria tenella*.

Figure 5:
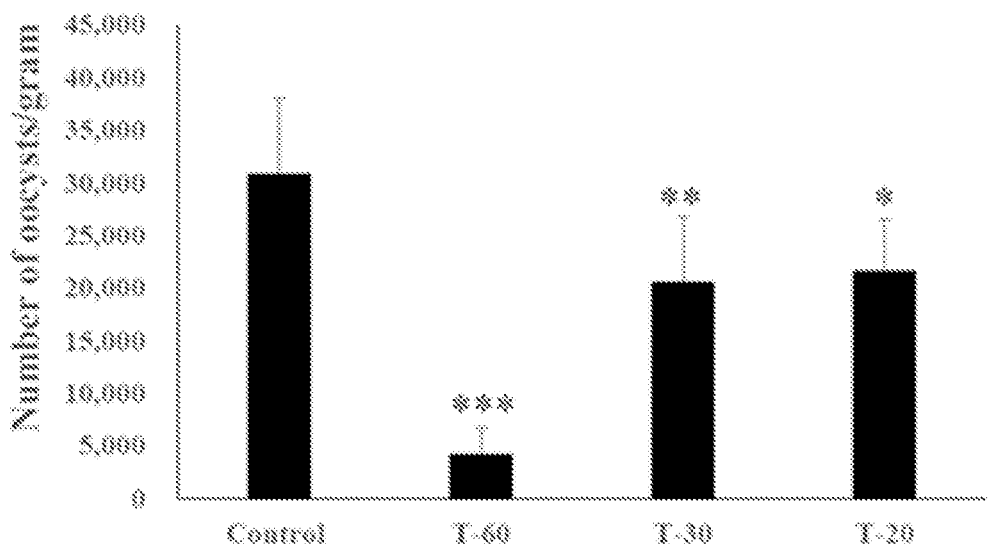
FIG. 5 is a graph showing destruction of oocysts of *Eimeria* spp. using microwave according to an embodiment of the present invention.

FIG. 5 is a graph showing destruction of oocysts of *Eimeria* spp. using microwave according to an embodiment of the present invention. As shown in FIG. 5, fecal oocysts present in the feces (80 to 100 grams) of a broiler chicken farm were irradiated with microwave of 700 W for 60 seconds (T-60), 30 seconds (T-30), 20 seconds (T-20), and 0 second (control).

At this time, an irradiated sample was left at room temperature for 5 days and the fecal oocyst number was confirmed by using a McMaster chamber. Compared to a control group, treatment groups showed a significant reduction effect of fecal oocyst.

*$p<0.001$, $p<0.01$, *$p<0.05$ indicate statistical significance compared to the control group. The results refer to mean value±standard deviation.

2. In Vivo Experiment Results:

Fecal oocysts of *Eimeria tenella* were irradiated with the microwave. The effect was verified after orally administering the irradiated fecal oocysts into chickens.

TABLE 1

| Items | No. of oocysts/ bird (n = 15) | | body weight (n = 15) | | | Lesion score (n = 7) | |
|---|---|---|---|---|---|---|---|
| | | | day 0 | day 9 PI | | | p value |
| Control (T-0) | 15,431,467 | 100% | 60.2 ± 4.3 | 133.3 ± 19.2 | 100% | 2 ± 1.3 | C |
| T-20 sec | 3,295,360 | 21% | 60.2 ± 5.0 | 142.6 ± 11.9 | 106.9% | 0 ± 0 | 0.0028 |

[Table 1] above shows the results of confirming the destruction of fecal oocyst of *Eimeria tenella* with the microwave in chickens. After mixing *Eimeria tenella* with sawdust (50 to 60 grams), the sample was irradiated with microwave of 700 W for 20 seconds (T-20) and 0 second (control, T-0).

The fecal oocyst number present in the irradiated sample was confirmed by using the McMaster chamber. Each chicken was orally administered 10,000 spore-formed fecal oocysts. The results of the treatment groups were compared with the control group (control, T-0). Feed including no anticoccidial drug was supplied during an experiment period. The results refer to mean value±standard deviation.

2-1. Reduction of Fecal Oocyst Number
   After the sample was administered to chickens, the fecal oocyst number (n=15) was measured by collecting feces for 6 to 9 days. The 20 second (T-20) group was reduced by 79% compared to the control group (control, T-0).

2-2. Increase in Body Weight Gain
   After the sample was administered to chickens, a body weight change for 9 days was measured (n=15). The 20 second (T-20) group increased 6.9% of body weight compared to the control group.

2-3. Reduction of Intestinal Lesion Score
   After the sample was administered to chickens, the degree of intestinal lesion was measured for 7 days (n=7). The 20-second (T-20) group was significantly reduced in the intestinal lesion compared to the control group.

3. Summary

This is an experiment to kill fecal oocysts of *Eimeria tenella* present in the chicken farm using the microwave.
   It was confirmed through in vitro experiment that the fecal oocysts were directly destroyed by the microwave (the fecal oocyst number present in the sample was reduced).
   It was confirmed through an in vivo experiment that the fecal oocysts were indirectly destroyed by the microwave (reduction of the fecal oocyst number discharged from feces, increased in the body weight, and reduction of the intestinal lesion score).

Above, the embodiments of the present invention have been described in detail with reference to the accompanying drawings, but this is merely an example and various modifications and changes are possible within the scope of the technical idea of the present invention. The scope of the present invention should be determined by the description of the claims below.

What is claimed is:

1. A device for reducing oocysts of Eimeria spp. using microwave, the device comprising:
    a main body unit with a plurality of wheel portions installed at a bottom side thereof to be movable, and a handle portion installed at a top portion thereof to control a direction of movement;
    a crushing device installed on a front bottom surface of the main body unit to crush and turn over litter in a chicken coop as it moves;
    a microwave device installed on a bottom side surface of the main body unit and irradiating microwave to the litter of the chicken coop that is crushed and turned over by the crushing device to reduce oocysts of *Eimeria* spp.; and
    a control unit installed on a top surface of the main body unit and connected to the microwave device, and controlling the microwave of the microwave device.

2. The device of claim 1, wherein the crushing device comprises:
    a plurality of connection rods installed on the front bottom surface of the main body unit, and connected to the main body unit with a gear to be rotatable;
    a plurality of crushing blades connected to each other by a rotating shaft between the connection rods and directly crushing and turning over the litter of the chicken coop according to the rotation of the rotating shaft; and
    a blocking film installed on the plurality of connection rods which are top sides of the plurality of crushing blades to protect the plurality of crushing blades from the outside and simultaneously to prevent the litter crushed by the plurality of crushing blades from scattering upward.

3. The device of claim 2, wherein a motor unit connected to the rotation shaft of the plurality of crushing blades to rotate the rotation shaft is further installed on one top side of the main body unit, and operates under the control of the control unit.

4. The device of claim 3, wherein a battery unit supplying power to the microwave device, the control unit, and the motor unit is further installed on the other top side of the main body unit.

5. The device of claim 1, wherein a plurality of microwave devices is installed on the bottom side surface of the main body unit, connected to the control unit, and controlled by the control unit.

* * * * *